(12) United States Patent
Lewis

(10) Patent No.: US 11,776,432 B1
(45) Date of Patent: Oct. 3, 2023

(54) SELF-ADHESIVE STICKERS CUSTOMIZING DEVICE

(71) Applicant: James H. Lewis, Paso Robles, CA (US)

(72) Inventor: James H. Lewis, Paso Robles, CA (US)

( * ) Notice: Subject to any disclaimer, the term of this patent is extended or adjusted under 35 U.S.C. 154(b) by 0 days.

(21) Appl. No.: 18/045,514

(22) Filed: Oct. 11, 2022

Related U.S. Application Data

(60) Provisional application No. 63/329,031, filed on Apr. 8, 2022.

(51) Int. Cl.
| | |
|---|---|
| *G09F 3/10* | (2006.01) |
| *C09J 7/40* | (2018.01) |
| *C09J 7/38* | (2018.01) |
| *G09F 3/02* | (2006.01) |
| *B44C 3/00* | (2006.01) |
| *C09J 7/24* | (2018.01) |

(52) U.S. Cl.
CPC ............... *G09F 3/10* (2013.01); *B44C 3/005* (2013.01); *C09J 7/38* (2018.01); *C09J 7/405* (2018.01); *C09J 7/245* (2018.01); *G09F 2003/023* (2013.01)

(58) Field of Classification Search
CPC ..... G09F 3/10; G09F 2003/023; B44C 3/005; C09J 7/38; C09J 7/405; C09J 7/245; Y10T 428/14
See application file for complete search history.

(56) References Cited

U.S. PATENT DOCUMENTS

| | | | | |
|---|---|---|---|---|
| 7,777,770 | B2 * | 8/2010 | Moreland ................. | G09F 3/10 |
| | | | | 347/171 |
| 8,252,717 | B2 * | 8/2012 | Moreland ................. | G09F 3/10 |
| | | | | 503/226 |
| 9,092,999 | B1 * | 7/2015 | Harruff ..................... | G09F 3/10 |
| 2002/0106471 | A1 * | 8/2002 | Kuo ....................... | B32B 27/065 |
| | | | | 428/41.9 |

FOREIGN PATENT DOCUMENTS

| | | | | | |
|---|---|---|---|---|---|
| EP | 0794523 | A2 * | 10/1997 | ............ | G09F 23/08 |
| EP | 3447752 | A1 * | 2/2019 | ............ | A24F 17/00 |
| GB | 2341137 | A * | 3/2000 | ............ | B44C 1/105 |

\* cited by examiner

*Primary Examiner* — Patricia L. Nordmeyer
(74) *Attorney, Agent, or Firm* — Brennan, Manna & Diamond, LLC

(57) ABSTRACT

The present invention relates to a customizing device that provides pressure-sensitive stickers or labels for releasably placing on virtually any type of surface to customize and alter the look of the surface. The device features two independent self-adhesive stickers on the front and back of peel-away wax paper, enabling users to apply one or both stickers on one or more desired surfaces. The self-adhesive stickers have reflective customized designs that can glow in black light and an adhesive layer for releasably adhering to a surface. For use, the adhesive stickers are peeled away from wax paper and releasably applied on a surface. The labels offer a method to advertise for a specific product or a method to customize and personalize an item with ease.

18 Claims, 7 Drawing Sheets

SELF-ADHESIVE STICKERS CUSTOMIZING DEVICE

CROSS-REFERENCE TO RELATED APPLICATION

The present application claims priority to, and the benefit of, U.S. Provisional Application No. 63/329,031, which was filed on Apr. 8, 2022, and is incorporated herein by reference in its entirety.

FIELD OF THE INVENTION

The present invention relates generally to the field of adhesive stickers. More specifically, the present invention relates to novel pressure-sensitive stickers or labels that can be placed on virtually any type of surface. The labels have customized designs that can reflect in ultraviolet light and enables users to customize and alter the look of their water bottles, laptops, boxes, and more. The stickers are attached to a wax paper from which they can be peeled away for application on a surface. The stickers can be applied to a flat surface and remain visible until removed. Accordingly, the present disclosure makes specific reference thereto. Nonetheless, it is to be appreciated that aspects of the present invention are also equally applicable to other like applications, devices, and methods of manufacture.

BACKGROUND

By way of background, individuals like customized and decorated different items and objects around them. Especially, individuals want customized personal items such as a water bottle, laptop, smartphone cover, and more that reflect their personalities. Standard items are simple in design and can become boring. As a result, often, a plurality of individuals can possess the same design of an item, thereby enabling individuals to mistakenly pick up items of other individuals. For some items such as a water bottle or a lunch box, this may cause transmission of germs and pathogens. Permanent means of customizing and decorating items may include paint, carving, and more but such permanent methods are expensive, time consuming, may require professional help, and permanently change the aesthetics of an item. Therefore, individuals desire a temporary and easy way of altering a look of their personal items.

Manufacturers also want a method that enables their customers to customize the items. Moreover, other than engraved or printed marketing logos on items such as a water bottle, container, and more, manufacturers currently do not have a method of temporarily customizing the items. Therefore, manufacturers need a method to use temporary means for cost effective advertising and marketing.

Businesses currently depend on expensive advertising strategies such as digital advertising, over-the-air advertising, and more for advertising and marketing. Advertising is required to increase profits and therefore, businesses are looking for easily implementable and cost-effective advertising opportunities.

Therefore, there exists a long-felt need in the art for a device that enables users to temporarily customize and alter the look of their items. There is also a long-felt need in the art for a device that provides to companies new and cost-effective advertising opportunities. Additionally, there is a long-felt need in the art for a device that does not permanently alter the look of the products. Moreover, there is a long-felt need in the art for a device that can releasably attach to an item. Further, there is a long-felt need in the art for a decorating device that provides more than one customizing option to users. Furthermore, there is a long-felt need in the art for a customizing option for items that can be applied to any type of item and surface. Finally, there is a long-felt need in the art for a device that offers a method to advertise for a specific product or a method to customize and personalize an item with ease.

The subject matter disclosed and claimed herein, in one embodiment thereof, comprises a pressure-sensitive sticker device for temporarily customizing items and surfaces. The device provides multiple ways of customizing items and features two self-adhesive labels or stickers configured to releasably attach to one or more items for customizing the items. The sticker device has a peel-away wax paper or other non-stick coating having a first surface and an opposite second surface, the first surface having a first sticker adhered thereto, the second surface having a second sticker adhered thereto, the stickers have a design or logo printed thereon and a pressure-sensitive adhesive layer, the first sticker and the second sticker are configured to independently peel off from the wax paper enabling a user to releasably attach on an item such as water bottles, laptops, boxes, and more.

In this manner, the temporarily adhering customizing labels of the sticker device of the present invention accomplish all of the foregoing objectives and provide users with pressure-sensitive stickers or labels that can be placed on virtually any type of surface to customize and alter the look of an item upon which label is releasably placed. Two independent stickers on both sides of a peel-away wax paper gives users more than one way of customization, which is not only temporary but easy and cost-effective.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pressure-sensitive sticker device. The device is designed to provide at least two self-adhesive labels or stickers that can be releasably attached to one or more items for customizing the items. The sticker device further comprising a wax paper having a first surface and an opposite second surface, the first surface having a first sticker adhered thereto, the second surface having a second sticker adhered thereto, the first sticker having a design or logo printed thereon and is adhered to the first surface using a pressure-sensitive adhesive layer, the second sticker having a design or logo printed thereon and is adhered to the second surface using a pressure-sensitive adhesive layer, the first sticker and the second sticker are configured to independently peel off from the wax paper enabling a user to releasably attach on an item such as water bottles, laptops, boxes, and more. The designs or logos printed on the first sticker and the second sticker are configured to illuminate under black light due to the presence of fluorescence material for converting the black light to the visible light.

In yet another embodiment, a self-adhesive vinyl overlay device for customizing items is disclosed. The device features two separate self-adhesive labels on the front and back of a peel-away wax paper such that the wax paper is sandwiched between the two self-adhesive labels, the individual label has a design on a top surface thereof and a base layer as an adhesive layer such that the adhesive layer releasably adheres to the peel-away wax paper. The labels are individually and separately peeled away from the wax paper and are releasably attached to a surface of an item for customizing the item.

In yet another embodiment, a method of releasably attaching a self-adhesive sticker on an item for temporarily customizing the item is described. The method includes the steps of providing a self-adhesive vinyl overlay device, the device includes a pair of stickers releasably attached to opposite sides of a wax paper, the stickers are configured to separately peel away from the wax paper; peeling away a first sticker from the pair of stickers from the wax paper; applying the adhesive layer of the first sticker on a first target surface; applying a pressure on the adhesive layer to adhere the first sticker on the target surface; peeling away a second sticker from the pair of stickers from the wax paper; applying the adhesive layer of the second sticker on a second target surface and applying a pressure on the adhesive layer of the second sticker to adhere the second sticker on the second target surface.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
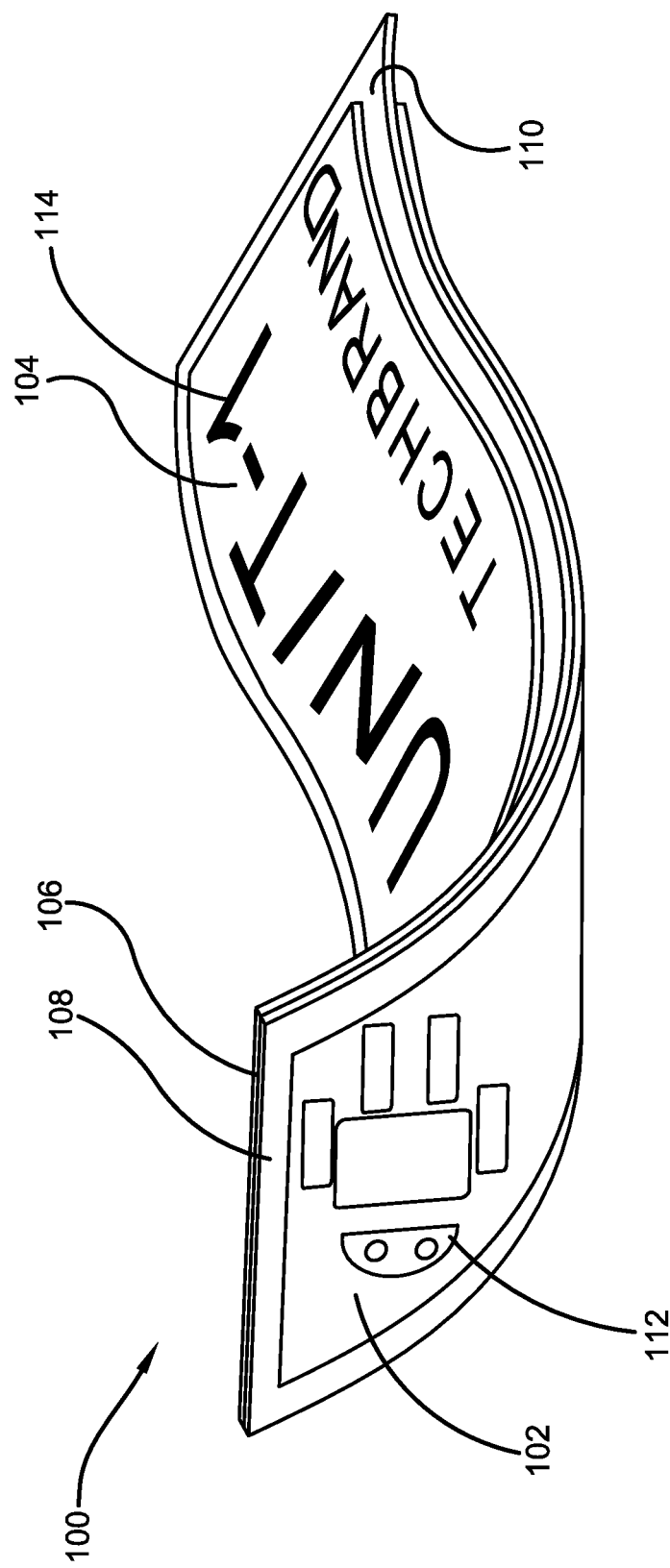
FIG. 1 illustrates a perspective view of one potential embodiment of temporary pressure-sensitive customizing stickers device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that enables users to temporarily customize and alter the look of their items. There is also a long-felt need in the art for a device that provides to companies new and cost-effective advertising opportunities. Additionally, there is a long-felt need in the art for a device that does not permanently alter the look of the products. Moreover, there is a long-felt need in the art for a device that can releasably attach to an item. Further, there is a long-felt need in the art for a decorating device that provides more than one customizing option to users. Furthermore, there is a long-felt need in the art for a customizing option for items that can be applied to any type of item and surface. Finally, there is a long-felt need in the art for a device that offers a method to advertise for a specific product or a method to customize and personalize an item with ease.

The present invention, in one exemplary embodiment, is a multifunctional, self-adhesive vinyl overlay device for temporarily customizing items by providing self-adhesive stickers or labels. The device features two separate self-adhesive labels on the front and back of a peel-away wax paper such that the wax paper is sandwiched between the two self-adhesive labels, the individual label has a design on a top surface thereof and a base layer as an adhesive layer such that the adhesive layer releasably adheres to the peel-away wax paper. The labels are individually and separately peeled away from the wax paper and are releasably attached to a surface of an item for customizing the item. The labels include reflective properties that can reflect under UV light for illumination.

Referring initially to the drawings, FIG. 1 illustrates a perspective view of one potential embodiment of temporary pressure-sensitive customizing stickers device of the present invention in accordance with the disclosed architecture. The temporary pressure-sensitive customizing stickers device 100 of the present embodiment is designed to provide two independent pressure-sensitive stickers 102, 104 that can be releasably attached to opposing surfaces of a substrate. The stickers 102, 104 are independent and can be separately used for customization of items as per preference of users. More specifically, the customizing device 100 includes a peel-away wax paper 106 having a first surface 108 upon which the first pressure-sensitive sticker 102 is adhered. An opposite second surface 110 of the wax paper 106 has the second pressure-sensitive sticker 104 adhered thereon. The stickers 102, 104 can have same or different designs and can come in different sizes, shapes, and designs.

The wax paper 106 is flexible and is preferably plain. The wax paper 106 may have a thickness from about 1 mm to about 5 mm and can be coated with an outer layer of paraffin wax 208 for enabling easy removal of the stickers 102, 104 for use. The wax paper 106 may be made of baking paper with wax coating thereon. The wax paper 106 may have a grams per square meter (GSM) from about 30 grams per square meter (GSM) to about 50 grams per square meter (GSM). Each sticker has a thin adhesive layer (as illustrated in FIG. 2) that enables the stickers 102, 104 to releasably attach to the surfaces 108, 110 and also to any other surface for customization.

Both the stickers 102, 104 and the wax paper 106 are waterproof and are scratchproof. The designs 112, 114 on the stickers 102, 104 respectively can be in two dimensional (2D) or three dimensional (3D) and used for customizing items upon which the stickers 102, 104 are releasably attached.

Figure 2:
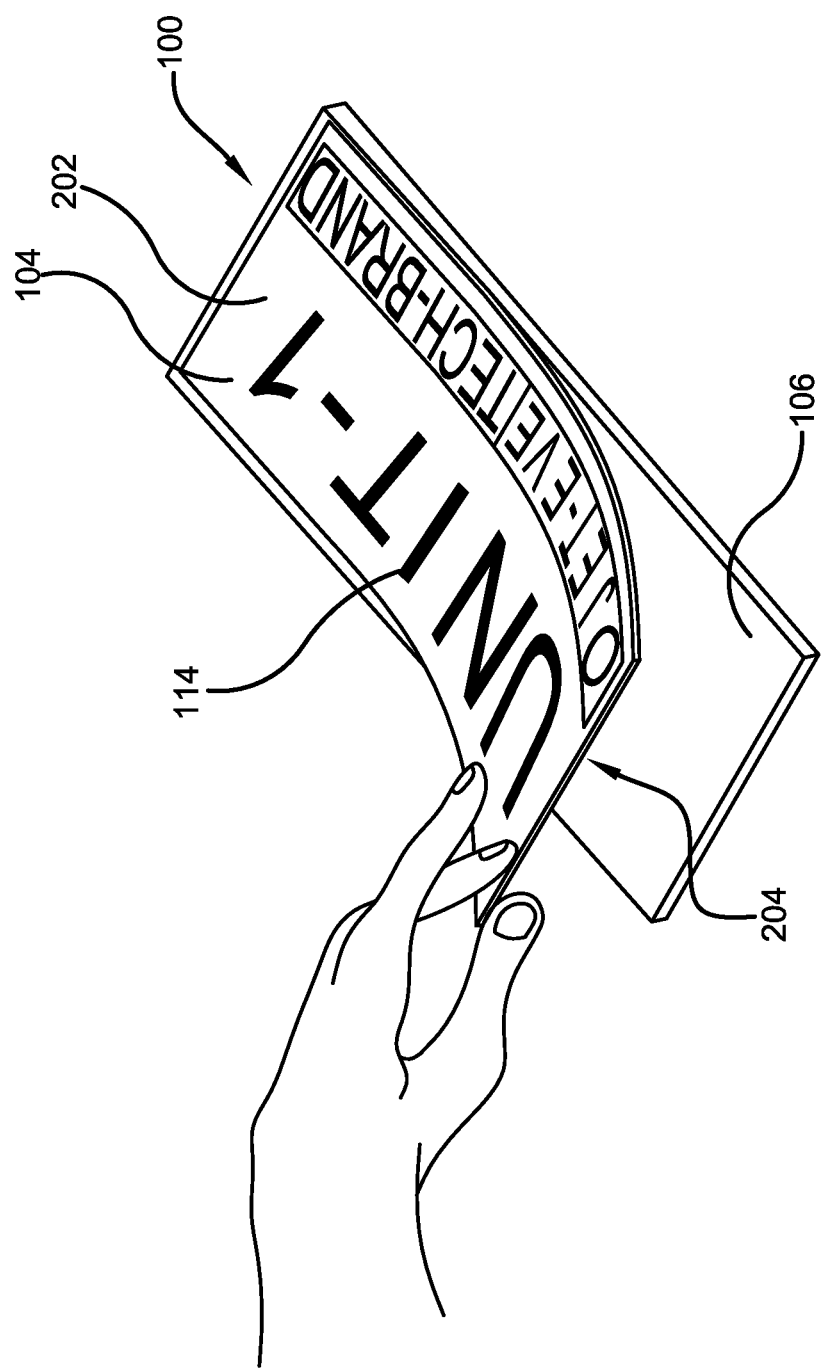
FIG. 2 illustrates a perspective view showing the layers of a sticker used in the temporary pressure-sensitive customizing stickers device of the present invention in accordance with the disclosed architecture.

FIG. 2 illustrates a perspective view showing the layers of a sticker used in the temporary pressure-sensitive customizing stickers device of the present invention in accordance with the disclosed architecture. In the present embodiment, the sticker 104 is shown as an example, but it should be noted that stickers of different embodiments of the present invention can have the similar construction and specification. More specifically, the sticker or label 104 has a top surface 202 that has the design or logo 114 disposed thereon. The design 114 can be any design and can be engraved or printed on the top surface 202. In the preferred embodiment, the top surface 202 is reflective and may reflect under ultraviolet (UV) light or black light. Under reflection, the design 114 may appear in neon color and glow in low light. The top surface 202 may convert ultraviolet light into visible light, and may have a significant fluorescent effect at dawn, dusk, or in bad weather such as rain, snow, and haze.

The bottom layer 204 of the sticker 104 is a polyvinyl chloride (PVC) film with a coating of thin adhesive layer 206. The coated 206 adhesive bottom layer 204 is pressure-sensitive and remains adhered to a surface unless manually removed by a user. As a result, the sticker 104 remains adhered to the wax paper 106 (as illustrated in FIG. 1) unless removed by the user as displayed in FIG. 2.

Pressure-sensitive vinyl layer 204 and adhesive coating 206 enables the sticker 104 to adhere to hard smooth surfaces through gently applied pressure without requiring any special hardware. Preferably, cast vinyl material is used for formation of the bottom layer that enables easy release of the sticker 104 from the wax paper 106.

Figure 3:
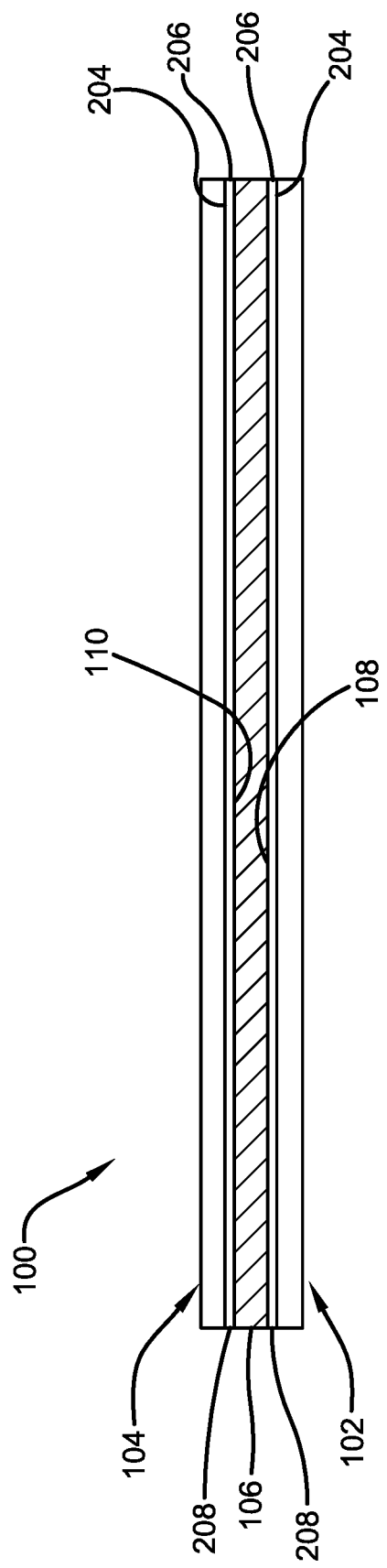
FIG. 3 illustrates a cross sectional view of the sticker device of the present invention in accordance with the disclosed architecture.

FIG. 3 illustrates a cross sectional view of the sticker device 100 of the present invention in accordance with the disclosed architecture. The sticker device 100 is a layered device having the wax paper 106 sandwiched between the stickers 102, 104. The pressure-sensitive vinyl layer of the individual stickers is adhered to the wax paper 106 such that a user is required to manually release or pull a sticker for applying on an item.

The size and thickness of the stickers 102, 104 may vary as per preferences of a user and design requirements, however, both the stickers 102, 104 have pressure-sensitive vinyl layer for adherence to a surface for decoration and customization.

Figure 4:
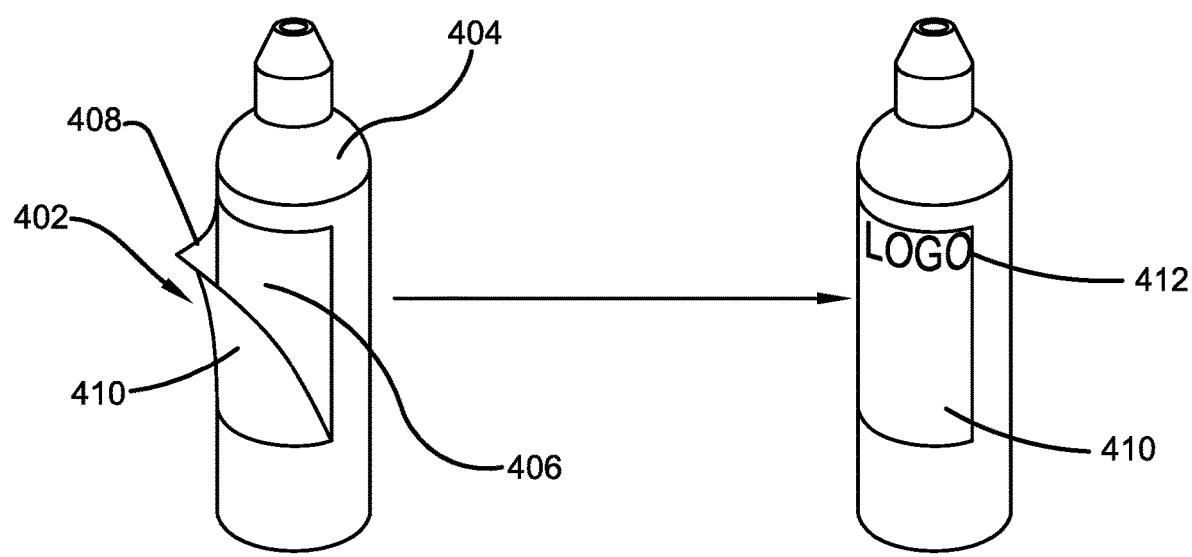
FIG. 4 illustrates a perspective view showing how a pressure-sensitive sticker is applied to an item for customizing the item in accordance with the disclosed architecture.

FIG. 4 illustrates a perspective view showing how a pressure-sensitive sticker is applied to an item for customizing the item in accordance with the disclosed architecture. The sticker 402 can have any customized design preferred by a user of the item embodied as a water bottle 404 in the present embodiment. For applying the sticker 402 on exterior surface 406 of the bottle 404, the sticker 402 is peeled away from the wax paper as illustrated in FIG. 2, then, the pressure-sensitive vinyl layer 408 of the label 402 is placed on the surface 406 and is pressed with small pressure thereby enabling the layer 408 to adhere to the surface 406.

The sticker 402 overlays a portion or existing logo or design of the water bottle 404 such that the top surface 410 of the sticker 402 having the customized design 412 becomes visible from outside to customize the look of the bottle 404. The sticker 402 is releasably attached to the water bottle 402 and the pressure-sensitive vinyl layer 408 does not leave any traces or spots on the bottle surface 406. The layer 408 is waterproof and does not shift once placed, even on a slippery surface.

Figure 5:
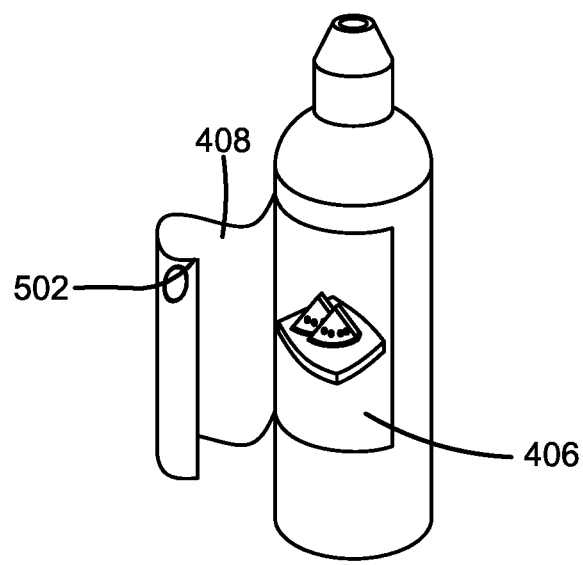
FIG. 5 illustrates a perspective view showing how the pressure-sensitive sticker applied in FIG. 4 is peeled away from the bottle in accordance with the disclosed architecture.

FIG. 5 illustrates a perspective view showing how the pressure-sensitive sticker applied in FIG. 4 is peeled away from the bottle in accordance with the disclosed architecture. For removing or peeling away the sticker 402, a corner, such as exemplary corner 502 of the sticker 402 is held by a user and is slightly pulled away from the surface 406 such that the sticker 402 is peeled away from the surface 406. The portion of the surface 406 being overlapped by the sticker 402 becomes visible and the sticker 402 being flexible easily peels away without leaving any stain on the target surface.

Figure 6:
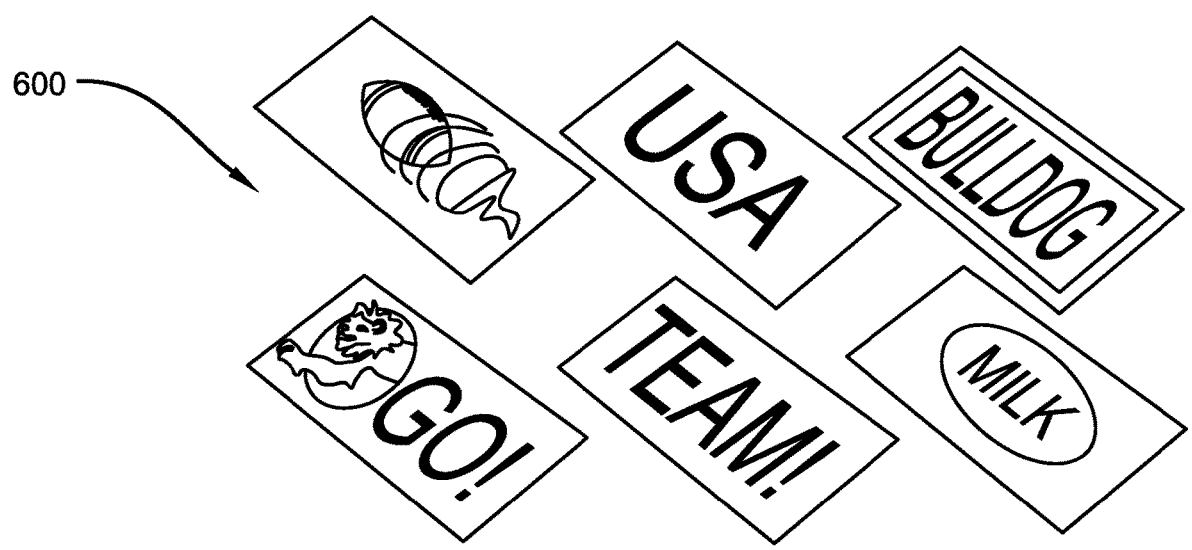
FIG. 6 illustrates a perspective view showing exemplary sticker devices of the present invention in accordance with the disclosed architecture.

FIG. 6 illustrates a perspective view showing exemplary sticker devices of the present invention in accordance with the disclosed architecture. The sticker devices of various embodiments of the present invention can have individual labels and stickers of various designs and sizes and can be customized to display logo, tagline and more of business for marketing and advertising purposes. As illustrated, the exemplary sticker devices 600 have stickers of various designs and each sticker device has a pair of same or different adhesive stickers as illustrated in FIG. 1. The individual stickers can be independently used and adhere to a surface.

In one embodiment, a sticker once peeled away from the wax paper cannot be adhered back to the wax paper. But in other embodiments, the sticker can adhere back to the wax paper using the adhesive layer of the sticker. The stickers can be of different sizes, designs, shapes, colors and may have reflective material.

Figure 7:
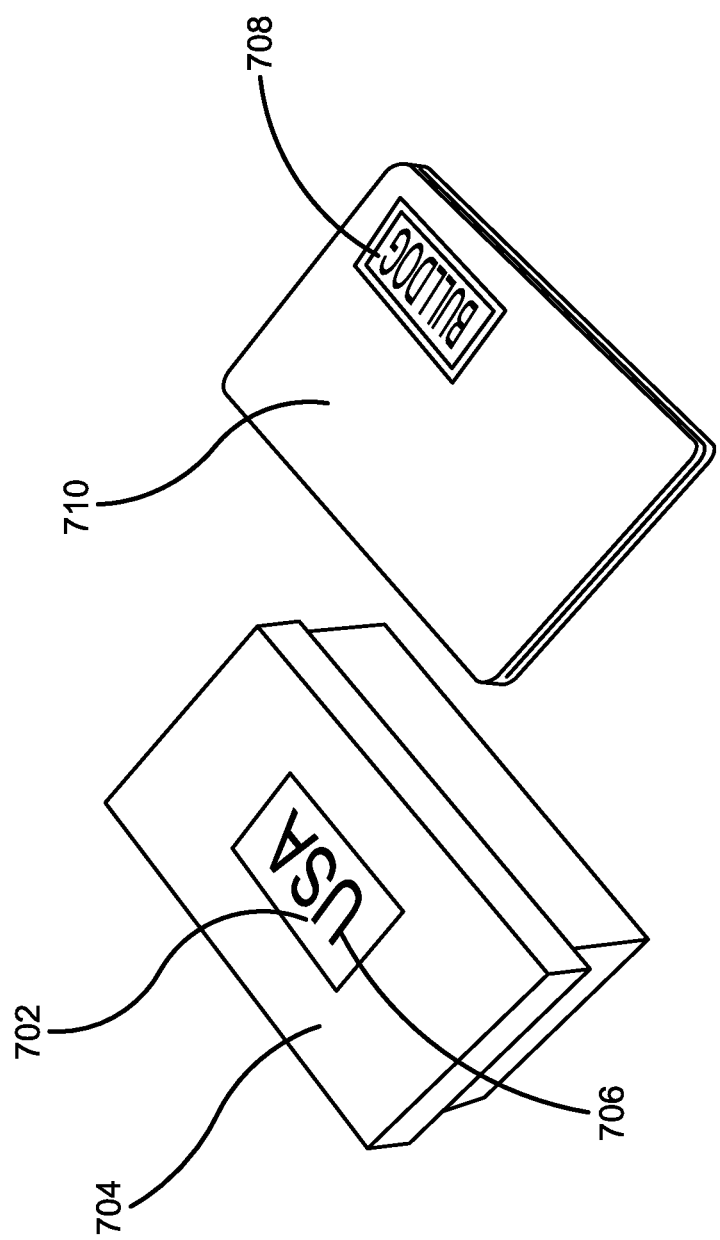
FIG. 7 illustrates a perspective view showing exemplary stickers adhered to a variety of items for customizing the items in accordance with the disclosed architecture.

FIG. 7 illustrates a perspective view showing exemplary stickers adhered to a variety of items for customizing the items in accordance with the disclosed architecture. As illustrated, an exemplary adhesive sticker 702 is releasably attached to a shoe box 704 for customizing and marketing purposes. The sticker 702 may have a logo or any other indicia 706.

Similarly, another exemplary sticker 708 is releasably attached on a laptop 710 for customizing the laptop 710 which otherwise looks plain and boring. The stickers 702, 708 can be peeled away and can be used on other items as per preferences of a user.

Certain terms are used throughout the following description and claims to refer to particular features or components. As one skilled in the art will appreciate, different persons may refer to the same feature or component by different names. This document does not intend to distinguish between components or features that differ in name, but not structure or function. As used herein "temporary pressure-sensitive customizing stickers device", "stickers device", "customizing device", and "device" are interchangeable and refer to the pressure-sensitive customizing stickers device 100, 600 of the present invention. Similarly, as used herein "sticker", "label", "adhesive sticker", and "adhesive label" are interchangeable and refer to the adhesive sticker 102, 104, 402, 702, 708 of the present invention.

Notwithstanding the foregoing, the pressure-sensitive customizing stickers device 100, 600 of the present invention can be of any suitable size and configuration as is known in the art without affecting the overall concept of the invention, provided that it accomplishes the above-stated objectives. One of ordinary skill in the art will appreciate that the pressure-sensitive customizing stickers device 100, 600 as shown in the FIGS. are for illustrative purposes only, and that many other sizes and shapes of the pressure-sensitive customizing stickers device 100, 600 are well within the scope of the present disclosure. Although the dimensions of the pressure-sensitive customizing stickers device 100, 600 are important design parameters for user convenience, the pressure-sensitive customizing stickers device 100, 600 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A temporary pressure-sensitive customizing sticker device comprising:
    at least two independent pressure-sensitive stickers releasably attached to opposing surfaces of a releasable paper wherein the release paper comprises a wax paper having an outer layer of paraffin wax;
    a first pressure-sensitive sticker adhered to a first surface of said releasable paper;
    a second pressure-sensitive sticker adhered to a second surface of said releasable paper;
    wherein said first surface comprising a first side of said releasable paper and said second surface comprising a second side of said releasable paper;
    said first side opposing of said second side;
    wherein said first pressure-sensitive sticker having a first area and said second pressure-sensitive sticker having a second area; and
    further wherein said first area is generally equal to said second area.

2. The temporary pressure-sensitive customizing sticker device of claim 1, wherein said wax paper is flexible.

3. The temporary pressure-sensitive customizing sticker device of claim 2, wherein said wax paper includes a thickness from about 1 mm to about 5 mm.

4. The temporary pressure-sensitive customizing sticker device of claim 1, wherein said wax paper comprises a grams per square meter (GSM) from about 30 grams per square meter (GSM) to about 50 grams per square meter (GSM).

5. The temporary pressure-sensitive customizing sticker device of claim 4, wherein said first pressure-sensitive sticker comprises a bottom layer of polyvinyl chloride (PVC) film having an outer adhesive coating for releasable attachment to said first surface of said releasable paper, and further wherein said second pressure-sensitive sticker comprises a bottom layer of polyvinyl chloride (PVC) film having an outer adhesive coating for releasable attachment to said second surface of said releasable paper.

6. The temporary pressure-sensitive customizing sticker device of claim 5, wherein said wax paper is waterproof.

7. The temporary pressure-sensitive customizing sticker device of claim 6, wherein said first pressure-sensitive sticker and said second pressure-sensitive sticker are two dimensional.

8. The temporary pressure-sensitive customizing sticker device of claim 7, wherein said first pressure-sensitive sticker comprises a reflective top surface.

9. The temporary pressure-sensitive customizing sticker device of claim 7, wherein said polyvinyl chloride (PVC) film is cast vinyl.

10. The temporary pressure-sensitive customizing sticker device of claim 6, wherein said first pressure-sensitive sticker and said second pressure-sensitive sticker are three dimensional.

11. A temporary pressure-sensitive customizing sticker device comprising:
    at least two independent pressure-sensitive stickers releasably attached to opposing surfaces of a releasable paper;
    a first pressure-sensitive sticker adhered to a first surface of said releasable paper;
    a second pressure-sensitive sticker adhered to a second surface of said releasable paper;
    wherein said first surface comprising a first side of said releasable paper and said second surface comprising a second side of said releasable paper;
    said first side opposing of said second side;
    wherein said first pressure-sensitive sticker having a first area and said second pressure-sensitive sticker having a second area;
    wherein said first area is generally equal to said second area;
    wherein said first pressure-sensitive sticker having a bottom layer of polyvinyl chloride (PVC) film including an outer adhesive coating for releasable attachment to said first surface of said releasable paper; and
    further wherein said second pressure-sensitive sticker having a bottom layer of polyvinyl chloride (PVC) film including an outer adhesive coating for releasable attachment to said second surface of said releasable paper.

12. The temporary pressure-sensitive customizing sticker device of claim 11, wherein said releasable paper is a wax paper.

13. The temporary pressure-sensitive customizing sticker device of claim 12, wherein said wax paper is flexible.

14. The temporary pressure-sensitive customizing sticker device of claim 13, wherein said wax paper includes a thickness from about 1 mm to about 5 mm.

15. The temporary pressure-sensitive customizing sticker device of claim 14, wherein said wax paper comprises an outer layer of paraffin wax.

16. The temporary pressure-sensitive customizing sticker device of claim 15, wherein said wax paper comprises a grams per square meter (GSM) from about 30 grams per square meter (GSM) to about 50 grams per square meter (GSM).

17. A temporary pressure-sensitive customizing sticker device comprising:
- at least two independent pressure-sensitive stickers releasably attached to opposing surfaces of a releasable paper;
- a first pressure-sensitive sticker adhered to a first surface of said releasable paper;
- a second pressure-sensitive sticker adhered to a second surface of said releasable paper;
- wherein said first surface comprising a first side of said releasable paper and said second surface comprising a second side of said releasable paper;
- said first side opposing of said second side;
- wherein said first pressure-sensitive sticker having a first area and said second pressure-sensitive sticker having a second area;
- wherein said first area is generally equal to said second area;
- wherein said releasable paper is flexible wax paper;
- wherein said wax paper includes a thickness from about 1 mm to about 5 mm;
- wherein said wax paper having an outer layer of paraffin wax;
- wherein said wax paper having a grams per square meter (GSM) from about 30 grams per square meter (GSM) to about 50 grams per square meter (GSM);
- wherein said first pressure-sensitive sticker having a bottom layer of polyvinyl chloride (PVC) film including an outer adhesive coating for releasable attachment to said first surface of said releasable paper;
- wherein said second pressure-sensitive sticker having a bottom layer of polyvinyl chloride (PVC) film including an outer adhesive coating for releasable attachment to said second surface of said releasable paper; and
- further wherein said first pressure-sensitive sticker and said second pressure-sensitive sticker are two dimensional.

18. The temporary pressure-sensitive customizing sticker device of claim 17, wherein said first pressure-sensitive sticker comprises a reflective top surface.

\* \* \* \* \*